US008933917B2

(12) United States Patent
Kim et al.

(10) Patent No.: US 8,933,917 B2
(45) Date of Patent: Jan. 13, 2015

(54) TIMING CONTROLLER, DISPLAY APPARATUS INCLUDING THE SAME, AND METHOD OF DRIVING THE SAME

(75) Inventors: Yong-Bum Kim, Suwon-si (KR); Bong-Ju Jun, Cheonan-si (KR); Dong-Hyun Yeo, Seoul (KR); Sang Keun Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 692 days.

(21) Appl. No.: 13/182,782

(22) Filed: Jul. 14, 2011

(65) Prior Publication Data

US 2012/0169686 A1 Jul. 5, 2012

(30) Foreign Application Priority Data

Jan. 3, 2011 (KR) ........................ 10-2011-0000275

(51) Int. Cl.

*G06F 3/038* (2013.01)
*G09G 3/20* (2006.01)
*G09G 3/36* (2006.01)
*G09G 5/00* (2006.01)

(52) U.S. Cl.

CPC ............ *G09G 3/2096* (2013.01); *G09G 3/3648* (2013.01); *G09G 5/008* (2013.01); *G09G 2330/06* (2013.01)
USPC .......................................................... 345/208

(58) Field of Classification Search

USPC .................... 345/55, 204, 208, 213; 327/105
See application file for complete search history.

(56) References Cited

U.S. PATENT DOCUMENTS

| | | | | |
|---|---|---|---|---|
| 7,057,609 | B2 | 6/2006 | Hwangbo et al. | |
| 7,196,658 | B2 * | 3/2007 | Inatsune | 342/202 |
| 2008/0074154 | A1 | 3/2008 | Shin | |
| 2009/0174691 | A1 * | 7/2009 | Yeo | 345/204 |
| 2010/0007648 | A1 * | 1/2010 | Nam et al. | 345/213 |
| 2010/0079611 | A1 * | 4/2010 | Suzuki et al. | 348/222.1 |
| 2011/0080382 | A1 * | 4/2011 | Koo | 345/204 |

FOREIGN PATENT DOCUMENTS

| | | |
|---|---|---|
| KR | 1020030058138 | 7/2003 |
| KR | 1020050045514 | 5/2005 |
| KR | 1020050076792 | 7/2005 |
| KR | 1020090119606 | 11/2009 |

* cited by examiner

*Primary Examiner* — Pegeman Karimi
(74) *Attorney, Agent, or Firm* — Cantor Colburn LLP

(57) ABSTRACT

A timing controller includes a receiver, an internal clock generator, a first frequency converter, a first selector and a control signal generator. The receiver receives an image signal and a main clock signal having a first spread spectrum frequency from an external system, converts the main clock signal to a converted main clock signal and the image signal to a first converted image signal, and outputs the converted main clock signal as a first clock signal having a plurality of frequencies. The internal clock generator multiplies the frequencies of the first clock signal and generates a second clock signal having a frequency band within the multiplied frequencies of the first clock signal. The first frequency converter converts the second clock signal to a third clock signal having a second spread spectrum frequency. The first selector selects one of the second clock signal and the third clock signal in response to a first selection signal and outputs the selected one of the second clock signal and the third clock signal as a control clock signal. The control signal generator receives the control clock signal to generate a control signal synchronized with the control clock signal.

13 Claims, 7 Drawing Sheets

TIMING CONTROLLER, DISPLAY APPARATUS INCLUDING THE SAME, AND METHOD OF DRIVING THE SAME

This application claims priority to Korean Patent Application No. 10-2011-0000275, filed on Jan. 3, 2011, and all the benefits accruing therefrom under 35 U.S.C. §119, the content of which in its entirety is herein incorporated by reference.

BACKGROUND OF THE INVENTION (1) Field of the Invention

The general inventive concepts relate to a timing controller, a display apparatus including the timing controller, and a method of driving the timing controller. More particularly, the general inventive concepts relate to a timing controller which reduces electromagnetic interference ("EMI"), a display apparatus including the timing controller, and a method of driving the timing controller.

(2) Description of the Related Art

A liquid crystal display is a type of flat panel displays including a liquid crystal display panel to display an image and a driver to drive the liquid crystal display panel. The driver typically receives image signals from an external system such as an image board, for example, and converts the image signals to drive the liquid crystal display panel.

When the liquid crystal display has large-scale and high resolution, the transfer volume of image data increases. Accordingly, a high-speed channel may be used between the external system and the driver for a large-scale high-resolution liquid crystal display. In addition, a high-speed interface may be used for fast data transfer between internal components of the driver.

However, as the data transfer rate increases, electromagnetic interference ("EMI") increases on a cable, through which the data is transferred.

BRIEF SUMMARY OF THE INVENTION

Exemplary embodiments of the present invention provide a timing controller that reduces electromagnetic interference ("EMI") and jitter components.

Exemplary embodiments of the present invention also provide a display apparatus including the timing controller.

Exemplary embodiments of the present invention also provide a method of driving the timing controller.

In an exemplary embodiment, a timing controller includes a receiver, an internal clock generator, a first frequency converter, a first selector and a control signal generator.

The receiver receives an image signal and a main clock signal having a first spread spectrum frequency from an external system, converts the main clock signal to a converted main clock signal and the image signal to a first converted image signal, and outputs the converted main clock signal as a first clock signal having a plurality of frequencies.

The internal clock generator multiplies the frequencies of the first clock signal and generates a second clock signal having a frequency band within the multiplied frequencies of the first clock signal. The first frequency converter converts the second clock signal to a third clock signal having a second spread spectrum frequency.

The first selector selects one of the second clock signal and the third clock signal in response to a first selection signal and outputs the selected one of the second clock signal and the third clock signal as a control clock signal. The control signal generator receives the control clock signal to generate a control signal synchronized with the control clock signal.

In an alternative exemplary embodiment, a timing controller includes a receiver, an internal clock generator, a first frequency converter, a second frequency converter, a first selector, a second selector and a control signal generator.

The receiver receives an image signal and a main clock signal having a first spread spectrum frequency from an external system, converts the main clock signal to a converted main clock signal and the image signal to a first converted image signal, and outputs the converted main clock signal as a first clock signal having a plurality of frequencies.

The internal clock generator multiplies the frequencies of the first clock signal to generate a second clock signal, and the first frequency converter converts the first clock signal to generate a third clock signal having a second spread spectrum frequency.

The second frequency converter converts the first clock signal to generate a fourth clock signal having a third spread spectrum frequency different from the second spread spectrum frequency. The first selector selects one of the second clock signal and the third clock signal in response to a first selection signal and outputs the selected one of the second clock signal and the third clock signal a control clock signal.

The selector selects one of the control clock signal and the fourth clock signal in response to a second selection signal and outputs the selected one of the control clock signal and the fourth clock signal as a fifth clock signal, and the control signal generator receives the clock signal from the first selector and generates a control signal synchronized with the clock signal.

In an exemplary embodiment, a display apparatus includes a data driver which generates a data voltage, a gate driver which generates a gate signal, and a timing controller which supplies a control signal and a clock signal, where at least one of the control signal and the clock signal are used to generate the gate signal and the data voltage. The timing controller includes a receiver, an internal clock generator, a first frequency converter, a first selector, a control signal generator, an interface clock generator and a data converter.

The receiver receives an image signal and a main clock signal having a first spread spectrum frequency from an external system, converts the main clock signal to a converted main clock signal and the image signal to a converted image signal, and outputs the converted main clock signal as a first clock signal having a plurality of frequencies.

The internal clock generator multiplies the frequencies of the first clock signal and generates a second clock signal having a frequency band within the multiplied frequencies of the first clock signal. The first frequency converter converts the second clock signal to a third clock signal having a second spread spectrum frequency.

The first selector selects one of the second clock signal and the third clock signal in response to a first selection signal and outputs the selected one of the second clock signal and the third clock signal as a control clock signal. The control signal generator receives the control clock signal from the first selector and generates a control signal synchronized with the control clock signal.

The interface clock generator converts the control clock signal based on an interface with the data driver and outputs a data clock signal, and the data converter the data clock signal from the interface clock generator and outputs image data information in synchronization with the data clock signal.

In an alternative exemplary embodiment, a display apparatus includes a data driver which generates a data voltage, a gate driver which generates a gate signal, and a timing controller which supplies a control signal and a clock signal, where at least one of the control signal and a clock signal is used to generate the gate signal and the data voltage. The timing controller includes a receiver, an internal clock generator, a first frequency converter, a second frequency converter, a first selector, a second selector, a control signal generator, an interface clock generator and a data converter.

The timing controller includes the receiver, the internal clock generator, the third frequency converter, the fourth frequency converter, the first selector, the second selector and the control signal generator.

The receiver receives an image signal and a main clock signal having a first spread spectrum frequency from an outside, converts the main clock signal and a data format of the image signal, and outputting the converted main clock signal as a first clock signal.

The internal clock generator multiplies frequencies of the first clock signal to generate a second clock signal, and the third frequency converter converts the first clock signal to generate a third clock signal having a second spread spectrum frequency.

The fourth frequency converter converts the first clock signal to output a fourth clock signal having a third spread spectrum frequency different from the second spread spectrum frequency, and the first selector selects one of the second and third clock signals in response to a first selection signal and outputs a selected signal as a control clock signal.

The selector selects one of the control clock signal and the fourth clock signal in response to a second selection signal and outputs a selected signal as a fifth clock signal, and the control signal generator receives the control clock signal and generates a control signal synchronizing to the control clock signal.

The interface clock generator converts the fifth clock signal according to an interface with the outside and outputs a data clock signal, and the data converter outputs a converted image signal received from the receiver, in synchronization with the data clock signal.

In an exemplary embodiment, a method of driving a timing controller includes converting a voltage level of an external clock signal having a first spread spectrum frequency to a first clock signal having a plurality of frequencies; multiplying frequencies of the first clock signal and filtering the multiplied frequencies of the first clock signal to generate a second clock signal having a frequency band; converting the second clock signal to generate a third clock signal having a second spread spectrum frequency; selecting one of the second clock signal and the third clock signal in response to a first selection signal and outputting the selected one of the second clock signal and the third clock signal as a control clock signal; and generating a control signal based on the control clock signal.

As described above, since the timing controller outputs the data clock signal having a spread spectrum frequency, EMI is substantially reduced when data are transferred between the data driver and the timing controller.

In addition, the timing controller filters an input spread spectrum clock such that a spread spectrum clock is generated based on the specific frequency band. Accordingly, the influence of the input spread spectrum clock is substantially reduced, and the quantity of jitter is substantially reduced from the output spread spectrum clock. Therefore, the signal distortion phenomenon caused by the jitter is substantially reduced, such that transmission quality is substantially improved.

BRIEF DESCRIPTION OF THE DRAWINGS

The above and other aspects, features and advantages of the present invention will become readily apparent by reference to the following detailed description when considered in conjunction with the accompanying drawings wherein.

DETAILED DESCRIPTION OF THE INVENTION

Figure 1:
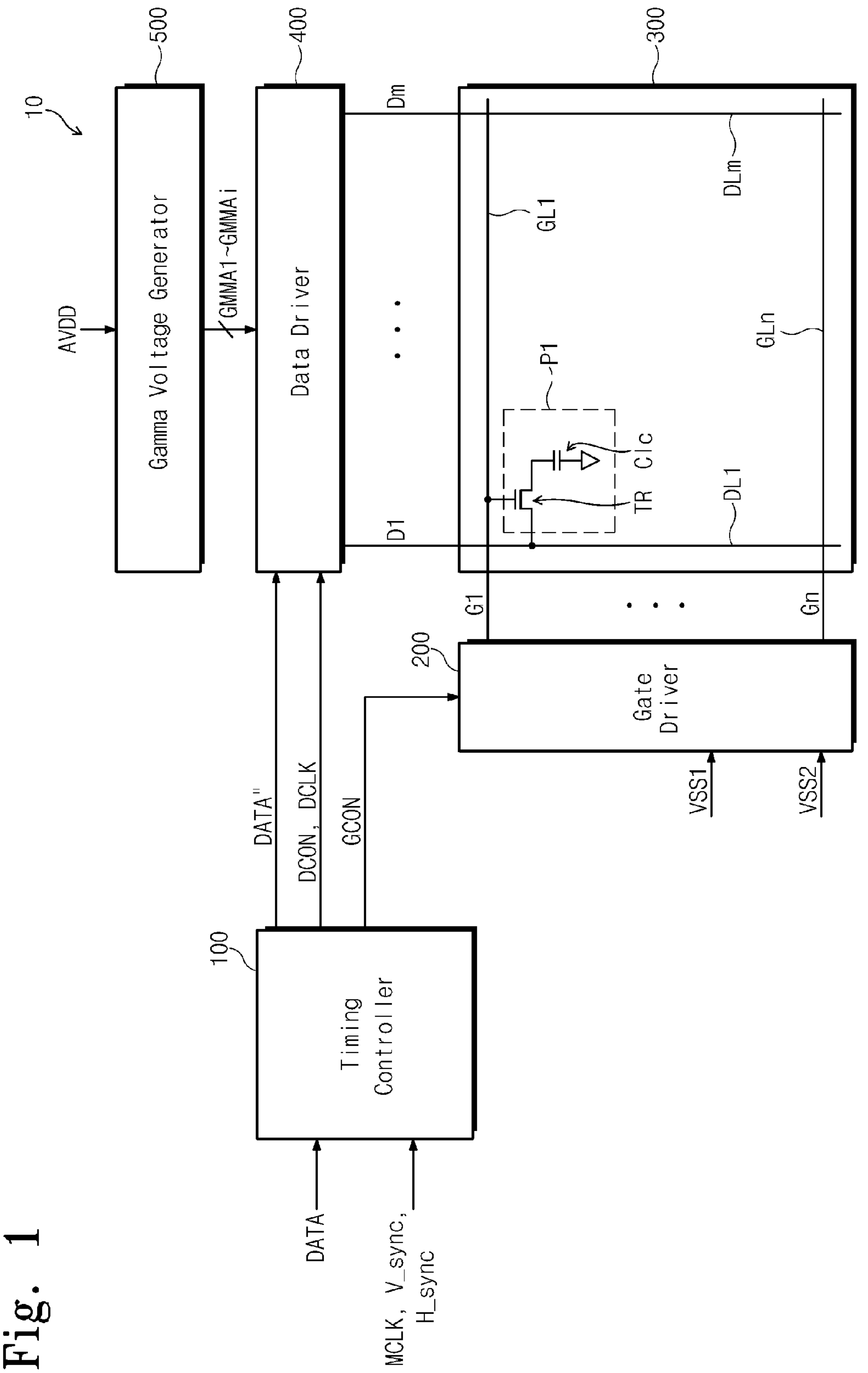
FIG. 1 is a block diagram showing an exemplary embodiment of a display apparatus according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the present invention will be described in detail with reference to accompanying drawings.

FIG. 1 is a block diagram showing an exemplary embodiment of a display apparatus 10 according to the present invention.

Referring to FIG. 1, the display apparatus 10 includes a timing controller 100, a gate driver 200, a display panel 300, a data driver 400 and a gamma voltage generator 500.

The display panel 300 includes a plurality of pixels P1 to display an image. The display panel 300 further includes gate lines GL1 to GLn and data lines DL1 to DLm to supply signals to the pixels P1. Gate signals G1 to Gn are sequentially applied to the gate lines GL1 to GLn, and data voltages D1 to Dm are applied to the data lines DL1 to DLm. Therefore, when each pixel row is turned on in response to the gate signals G1 to Gn, the data voltages D1 to Dm are applied to the pixel row which has been turned on, such that the pixels P1 may be scanned in row-by-row. After all of the pixels P1 have been scanned, an image corresponding to a unit frame is displayed on the display panel 300.

In an exemplary embodiment, each pixel P1 may include a thin film transistor TR connected to a corresponding gate line of the gate lines GL1 to GLn and a corresponding data line of the data lines DL1 to DLm, and a liquid crystal capacitor Clc connected to a drain electrode of the thin film transistor TR. However, the pixels P1 should not be limited thereto, and the pixel P1 may have various structures.

The timing controller 100 receives an image signal DATA, a horizontal synchronization signal H_sync, a vertical synchronization signal V_sync and a main clock signal MCLK from an external system of the display apparatus 10.

The timing controller 100 converts the image signal DATA to a converted image signal DATA", and supplies the converted images signals DATA" to the data driver 400. In an exemplary embodiment, the timing controller 100 may convert the data format of the image signal DATA such that the image signals DATA are suitable for the interface with the data driver 400. The timing controller 100 supplies data control signals DCON (e.g., an output start signal, a start signal, and a polarity inversion signal) and a data clock signal DCLK to the data driver 400, and supplies gate control signals GCON (e.g., start signal, clock signal, clock bar signal, and reset signal) to the gate driver 200.

The gate driver 200 receives first and second power supply voltages VSS1 and VSS2, and sequentially outputs gate signals G1 to Gn in response to the gate control signals GCON supplied from the timing controller 100.

The data driver 400 selects voltages corresponding to the converted image signal DATA" from gamma reference voltages GMMA1 to GMMAi in response to the data control signal DCON supplied from the timing controller 100, and outputs the voltages as the data voltages D1 to Dm. The data voltages D1 to DM are applied to the display panel 300.

The gamma voltage generator 500 receives an analog driving voltage AVDD to generate the gamma reference voltages GMMA1 to GMMAi, and supplies the gamma reference voltages GMMA1 to GMMAi to the data driver 400. The gamma voltage generator 500 may have a resistor-string structure including a plurality of resistors (not shown) connected to each other in series between a terminal of the analogue driving voltage AVDD and a grounding voltage terminal. The gamma voltage generator 150 may output the gamma reference voltages GMMA1 to GMMAi corresponding to electric potentials at nodes of two adjacent resistors, which are connected.

Figure 2:
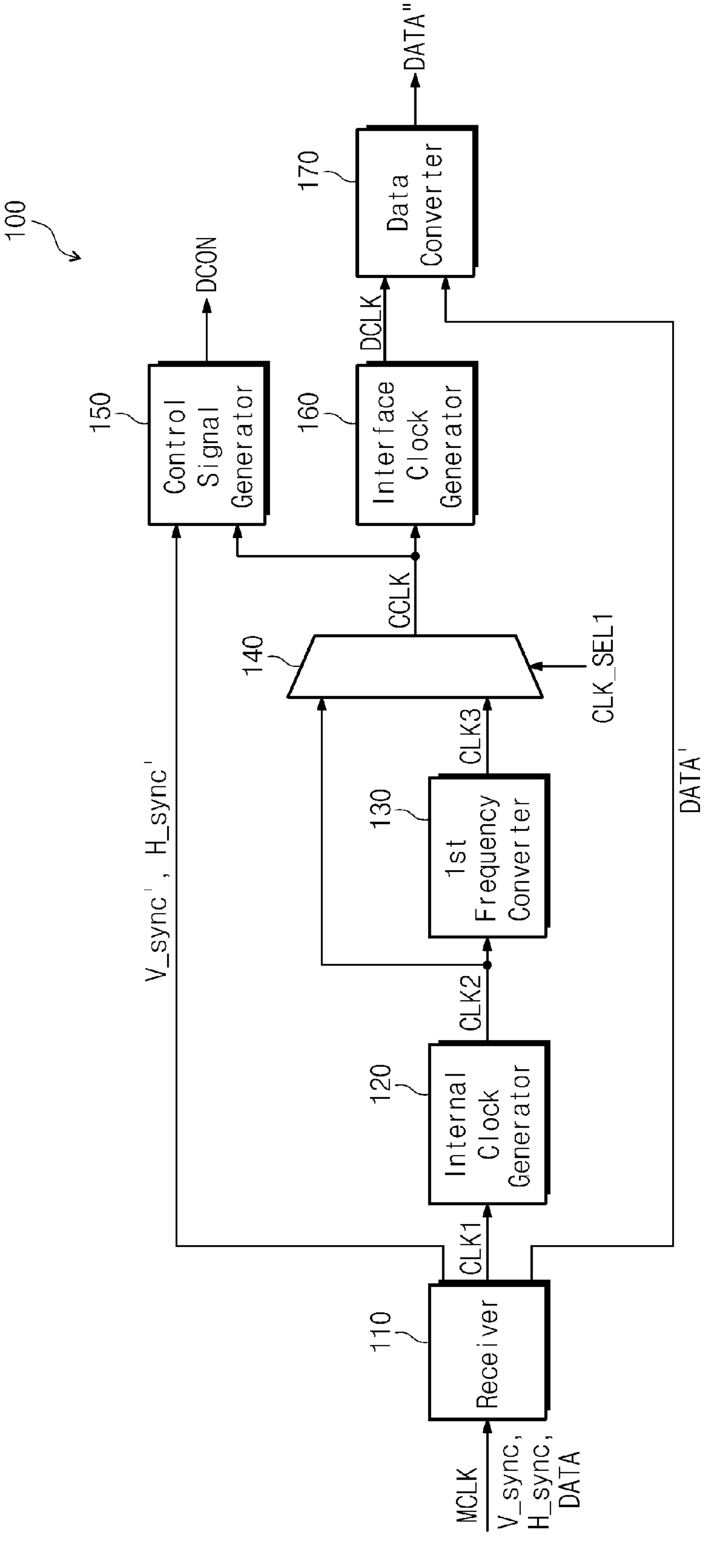
FIG. 2 is a block diagram showing an exemplary embodiment of a timing controller of FIG. 1.

FIG. 2 is a block diagram showing an exemplary embodiment of the timing controller 100 according to the present invention.

Referring to FIG. 2, the timing controller 100 includes a receiver 110, an internal clock generator 120, a first frequency converter 130, a first selector 140, a control signal generator 150, an interface clock generator 160 and a data converter 170.

The receiver 110 receives the horizontal synchronization signal H_sync, the vertical synchronization signal V_sync, the main clock signal MCLK and the image signal DATA. The horizontal synchronization signal H_sync, the vertical synchronization signal V_sync, and the image signal DATA may be signals transmitted using low voltage differential signaling ("LVDS"). The main clock signal MCLK may include a spread spectrum clock signal varying according to time based on to a reference frequency to reduce electromagnetic interference ("EMI"). The spread spectrum clock signal has spread spectrum frequencies fluctuating within a predetermined range (hereinafter referred to as "fluctuation range") at a predetermined period (hereinafter referred to as "period")

based on the reference frequency. The inverse of the period is referred to as a modulating frequency.

The receiver 110 converts the horizontal synchronization signal H_sync, the vertical synchronization signal V_sync and the image signal DATA to transistor-transistor logic ("TTL") signals. In an exemplary embodiment, the receiver 110 converts the image signal DATA to a first converted image signal DATA'. In one exemplary embodiment, for example, the main clock signal MCLK is converted to a first clock signal CLK1 having a plurality of frequencies. In an exemplary embodiment, only a signal format may be changed in the receiver 110, and the first clock signal CLK1 thereby has the plurality of frequencies, for example, a spread spectrum frequency substantially similar to the spread spectrum frequency of the main clock signal MCLK. In one exemplary embodiment, for example, the reference frequency of the spread spectrum frequency is about 75 megahertz ("MHz"), and the fluctuation range thereof is between about ±1% and about ±3% of the reference frequency, and the modulating frequency may be about 150 kilohertz ("kHz").

The internal clock generator 120 multiplies the frequencies of the first clock signal CLK1, and filters the multiplied frequencies of the first clock signal CLK1 to generate a second clock signal CLK2 having a frequency band within the multiplied frequencies of the first clock signal CLK1, e.g., a specific frequency band within the frequencies of the spread spectrum frequency. In one exemplary embodiment, for example, the reference frequency of the first clock signal CLK1 may be doubled when the frequencies of the first clock signal CLK1 is multiplied by 2, such that the reference frequency of the first clock signal CLK1 may be about 150 MHz. In an exemplary embodiment, the internal clock generator 120 may include a phase-locked loop ("PLL") circuit.

Although not shown in figures, the internal clock generator 120 may include a filter, and only frequencies in a specific frequency band of the multiplied frequencies of first clock signal CLK1 may partially pass through the filter by narrowing the bandwidth of the filter. The specific frequency band may include the reference frequency. Accordingly, the second clock signal CLK2 may have a single frequency such that the frequency of the second clock signal CLK2 is not changing.

The first frequency converter 130 converts the second clock signal CLK2 to a third clock signal CLK3 having a second spread spectrum frequency. Since the third clock signal CLK3 is generated based on the second clock signal CLK2, the third clock signal CLK3 has a first fluctuation range and a first period based on the reference frequency of the second clock signal CLK2. In one exemplary embodiment, for example, the first fluctuation range may be between about ±1% and about ±3% of the reference frequency, and the first reference modulation frequency may be about 150 kHz.

The first selector 140 outputs one of the second clock signal and the third clock signal as a control clock signal CCLK in response to a first selection signal CLK_SEL1. The value of the first selection signal CLK_SEL1 is determined depending on whether the timing controller 100 outputs a spread spectrum clock.

The control signal generator 150 receives converted horizontal and vertical scanning signals H_sync' and V_sync' from the receiver 110, and receives the control clock signal CCLK from the first selector 140 to generate the gate and data control signals GCON and DCON.

The interface clock generator 160 receives the control clock signal CCLK, converts the control clock signal CCLK, such that the control clock signal CCLK is suitable for the interface with the data driver 400, and generates the data clock signal DCLK. The data clock signal DCLK is output to the data converter 170.

The data converter 170 receives the first converted image signal DATA', which is converted through a TTL scheme, from the receiver 110, converts the first converted image signal DATA' to a second converted image signal DATA" in synchronization with the data clock signal DCLK, and outputs the second converted image signals DATA" to the data driver 400.

Figure 3:
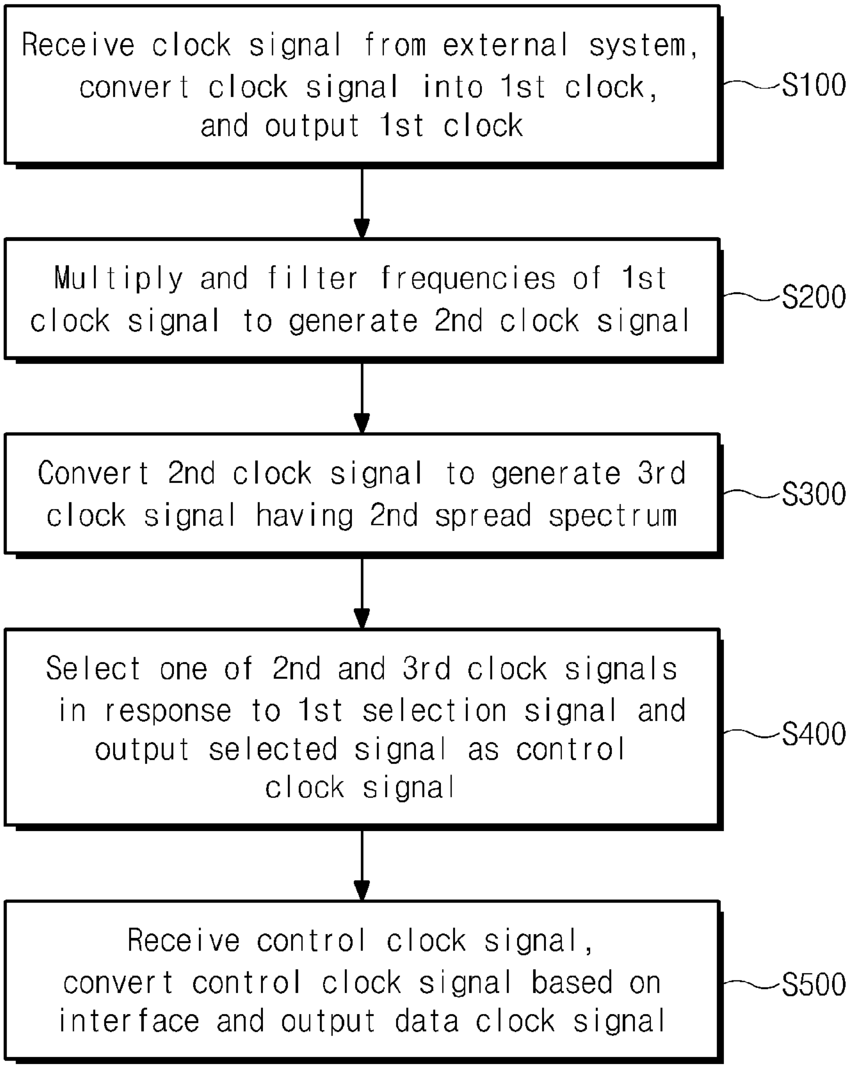
FIG. 3 is a flowchart showing an exemplary embodiment of a method of driving the timing controller according to the present invention.

FIG. 3 is a flowchart showing an exemplary embodiment of a driving method of the timing controller 100 according to the present invention.

Referring to FIGS. 2 and 3, the timing controller 100 receives the main clock signal MCLK having first spread spectrum frequencies from the external system, such as an image board, for example, and converts the main clock signal MCLK to the first clock signal CLK1 obtained through TTL scheme (S100). Then, the frequencies of the first clock signal CLK1 are multiplied, and the multiplied frequencies of the first clock signal CLK1 are filtered such that the second clock signal CLK2 having a specific frequency band is generated (S200).

Then, frequency modulation with respect to the second clock signal CLK2 is performed to generate the third clock signal CLK3 having a second spread spectrum frequency (S300). The third clock signal CLK3 is transferred to the first selector 140, and the first selector 140 selects one of the second and third clock signals CLK2 and CLK3 in response to the first selection signal CLK_SEL1, and outputs the selected one of the second and third clock signals as the control clock signal CCLK (S400).

The data control signal DCON and the gate control signal GCON are generated based on the control clock signal CCLK. In addition, the control clock signal CCLK is converted based on the interface with the data driver 400 to generate the data clock signal DCLK (S500). After an image signal having the TTL scheme, e.g., the first converted image signal DATA', is converted to be in synchronization with the data clock signal DCON, the converted image signal, e.g., the second converted data signal DATA", is output to the data driver 400.

As described above, since the timing controller 100 outputs the data clock signal DCLK having the spread spectrum frequencies, EMI is substantially reduced when signals are transferred from the data driver 400 to the timing controller 100.

In an exemplary embodiment, the timing controller 100 filters the first clock signal CLK1, such that the first clock signal CLK1 has a predetermined frequency band among frequencies thereof. Accordingly, the quantity of jitter is substantially reduced. Therefore, the signal distortion phenomenon caused by the jitter is substantially reduced, such that transmission quality is substantially improved. The improvement in the transmission quality will be shown referring to FIGS. 4A and 4B.

Figure 4A:
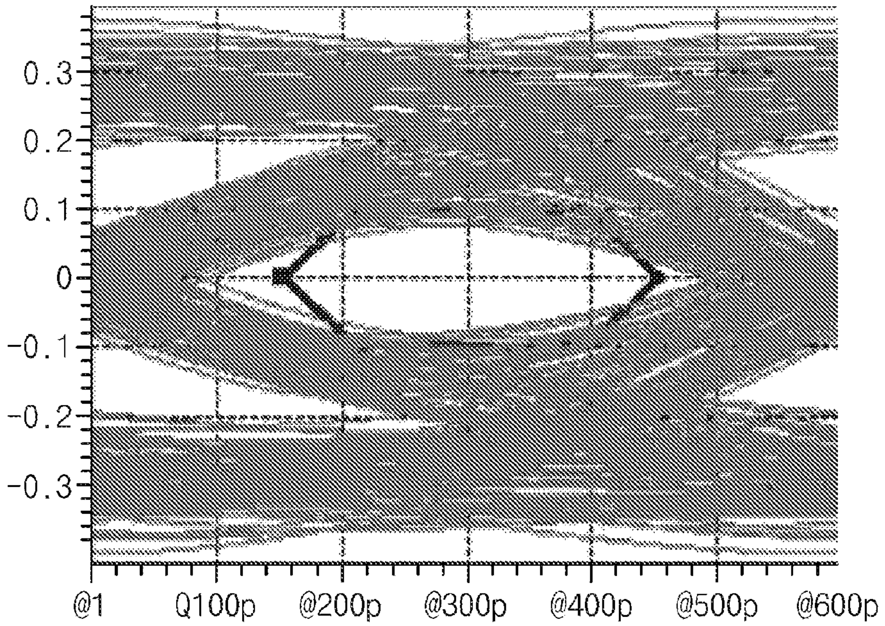
FIG. 4A is an eye diagram showing signals received in a receiver of a data driver of a conventional display apparatus
Figure 4B:
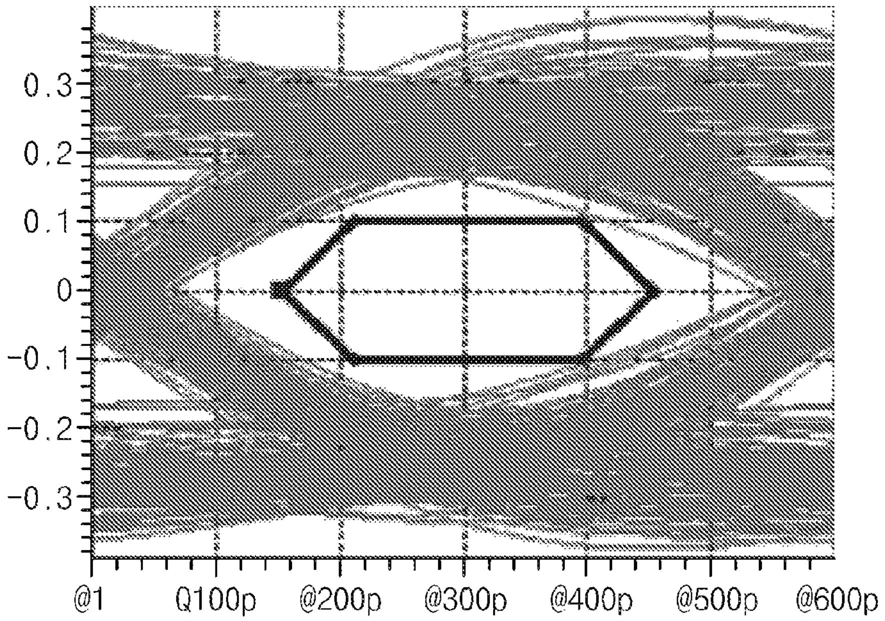
FIG. 4B is an eye diagram showing signals received in a data driver of an exemplary embodiment of the display apparatus according to the present invention.

FIG. 4A is an eye diagram showing signals received in a receiver of a data driver of a conventional display apparatus, and FIG. 4B is an eye diagram showing signals received in the data driver of an exemplary embodiment of the display apparatus according to the present invention. An eye diagram refers to a standard representing the minimum width and the minimum height required to recognize data in a signal receiving terminal. In FIGS. 4A and 4B, an x-axis refers to time (second), and a y-axis refers to the magnitude of a differential voltage (milivolt, mV).

Referring to FIGS. 4A and 4B, since the conventional display apparatus generates a spread spectrum clock based on a clock signal having a spread spectrum frequency, a jitter component increases. Therefore, since the interference between signals transferred to the data driver increases, an eye pattern covers a hexagon positioned at the central portion of the graph in FIG. 4A. In contrast, as shown in FIG. 4B, since a clock having a spread spectrum frequency is generated based on the second clock signal CLK2 having only a portion of the frequencies of the main clock signal MCLK, a jitter component is substantially reduced. Therefore, since the interference between signals transferred to the data driver 400 is substantially reduced, the eye pattern does not cover the hexagon positioned at the central portion of the graph in FIG. 4.

Figure 5:
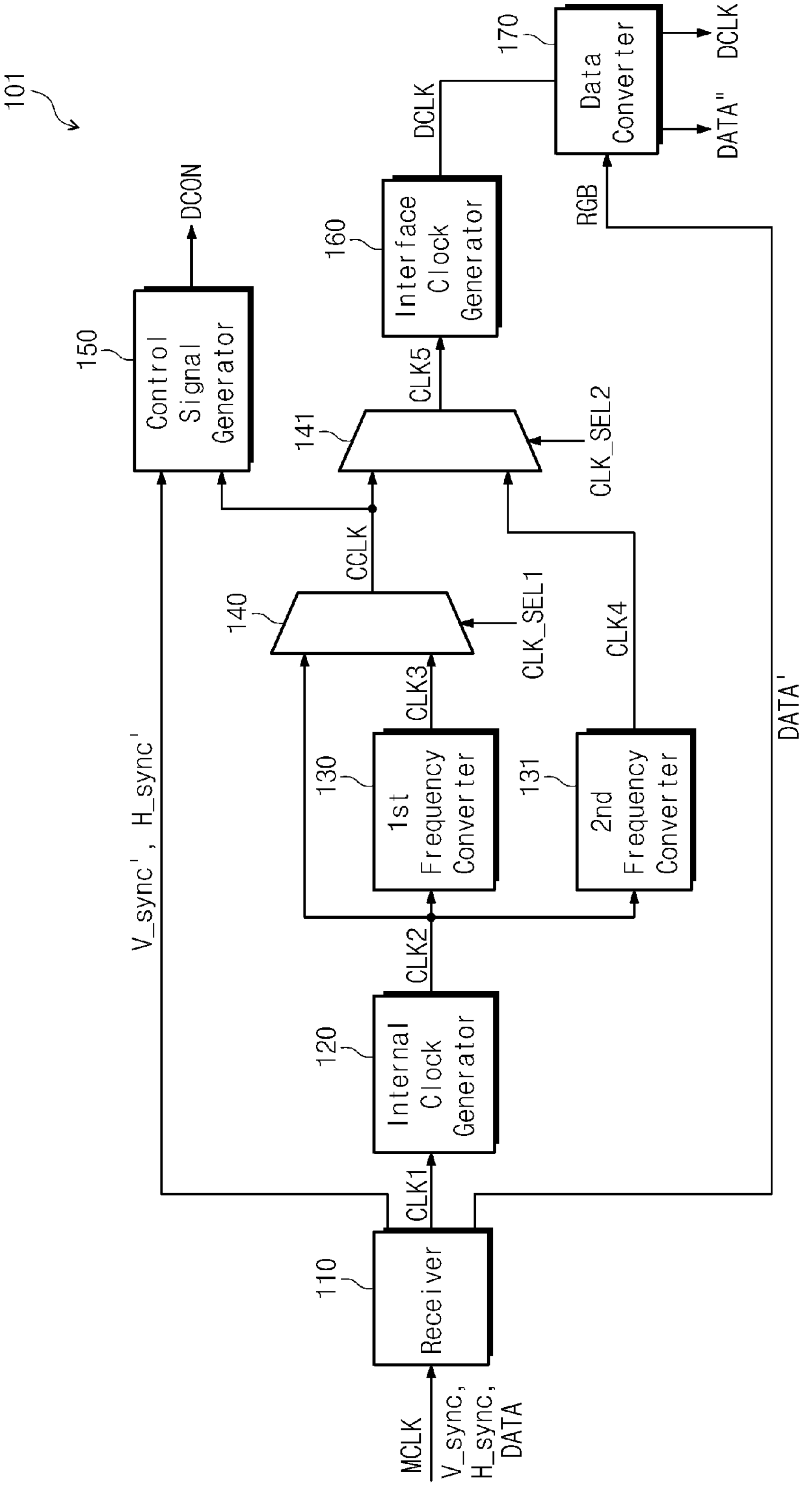
FIG. 5 is a block diagram showing an alternative exemplary embodiment of the timing controller according to the present invention.

FIG. 5 is a block diagram showing an alternative exemplary embodiment of the timing controller 101 according to the present invention.

Referring to FIG. 5, the timing controller 101 includes the receiver 110, the internal clock generator 120, the first frequency converter 130, a second frequency converter 131, the first selector 140, a second selector 141, the control signal generator 150, the interface clock generator 160 and the data converter 170.

Since the receiver 110, the internal clock generator 120, the first frequency converter 130, the first selector 140, the control signal generator 150 and the data converter 170 in FIG. 5 are substantially the same as those shown in FIG. 2, the same elements shown in FIG. 5 have been labeled with the same reference characters as used above to describe the exemplary embodiments of the timing controller 100 shown in FIG. 2, and any repetitive detailed description thereof will hereinafter be omitted or simplified.

The second frequency converter 131 converts the second clock signal CLK2 into a fourth clock signal CLK4 having a third spread spectrum frequency. Since the fourth clock signal CLK4 is generated based on the second clock signal CLK2, the fourth clock signal CLK4 has a second fluctuation range and a second period based on the reference frequency of the second clock signal CLK2. The second spread spectrum frequency is different from the third spread spectrum frequency. The second and third spread spectrum frequencies may have second and third spread spectrum frequencies f3 and f4, first and second fluctuation ranges W1 and W2, and first and second periods T1 and T2, respectively, as shown in the graph of FIG. 6.

Figure 6:
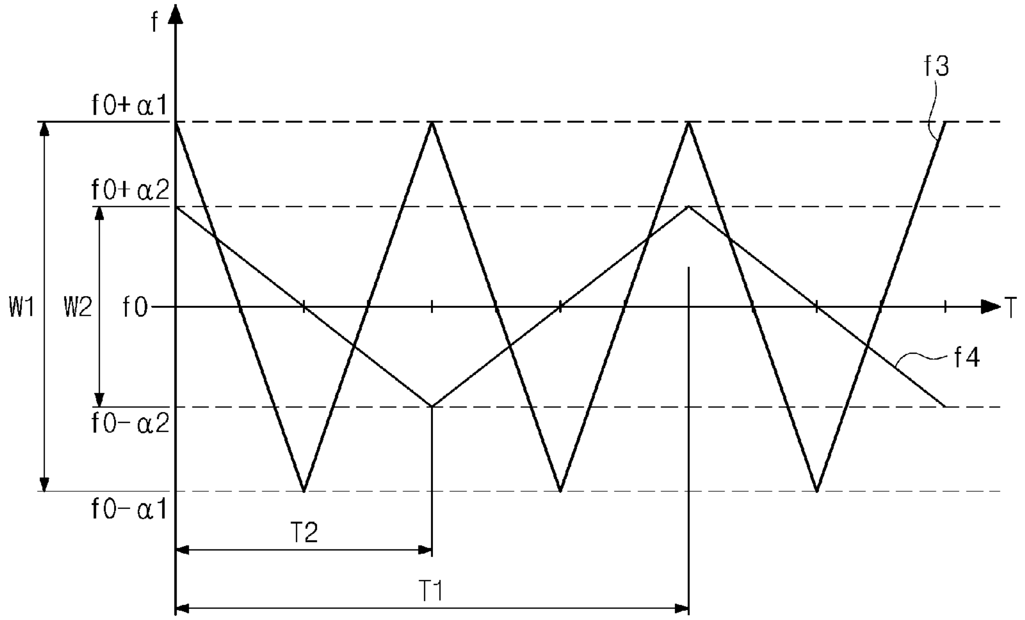
FIG. 6 is a graph showing a second spread spectrum frequency of the second clock signal and a third spread spectrum frequency of a fourth clock signal generated in an exemplary embodiment of the timing controller.

FIG. 6 is a graph showing a second spread spectrum frequency of the second clock signal and a third spread spectrum frequency of a fourth clock signal generated in an exemplary embodiment of the timing controller 101. In the graph of FIG. 6, an x-axis refers to time (second), and a y-axis refers to the intensity of a frequency (Hz).

Referring to FIG. 6, the frequency of the second clock signal having the second spread spectrum frequency f3 and the frequency of the fourth clock signal having the third spread spectrum frequency f4 change according to time based on the same reference frequency f0. The third spread spectrum frequency f3 of the fourth clock signal CLK4 may have a fluctuation width less than that of the second spread spectrum frequency f3 of the third clock signal CLK3. In an exemplary embodiment, a first fluctuation range W1 may be greater than a second fluctuation range W2, and a first period T2 may be less than a second period T1.

The second selector 141 outputs one of the control clock signal CCLK and the fourth clock signal CLK4 as a fifth clock signal CLK5 in response to the second selection signal CLK_SEL2.

A value of the second selection signal CLK_SEL2 is determined depending on when the timing controller 101 generates the data clock signal DCLK based on the control clock signal CCLK. Since the transfer volume of the first converted image signal DATA" is greater than the transfer volume of the data control signal DCON, the first converted image signal DATA" is transferred at a higher speed. Accordingly, when the second converted image signal DATA" is transferred, the probability of jitter increases. Therefore, when the first converted image signal DATA' is converted into the second converted image signal DATA", a clock having a spread spectrum frequency in the fluctuation range less than the fluctuation range of a spread spectrum frequency of the control clock signal CCLK is used. Accordingly, the quantity of jitter is thereby substantially reduced.

The interface clock generator 160 receives the fifth clock signal CLK5 and converts the fifth clock signal CLK5 based on the interface with the data driver 400 to generate the data clock signal DCLK. The data clock signal DCLK is output to the data converter 170.

As described above, since the timing controller 101 outputs the data clock signal DCLK having a spread spectrum frequency, EMI is substantially reduced when signals are transferred between the data driver 400 and the timing controller 100.

Since the timing controller 101 filters the first clock signal CLK1 such that the first clock signal CLK1 has a portion of the frequencies thereof. Accordingly, the quantity of jitter is substantially reduced. In exemplary embodiments, when the image signal is converted, a clock signal having a spread spectrum frequency, fluctuating in the fluctuation range less than the fluctuation range of the of the spread spectrum frequency of the clock signal used to generate the control signal, is used, thereby the quantity of jitter is substantially reduced as compared the exemplary embodiment shown in FIG. 2. Therefore, signal distortion caused by the jitter is substantially reduced, such that the transmission quality substantially increases.

Figure 7:
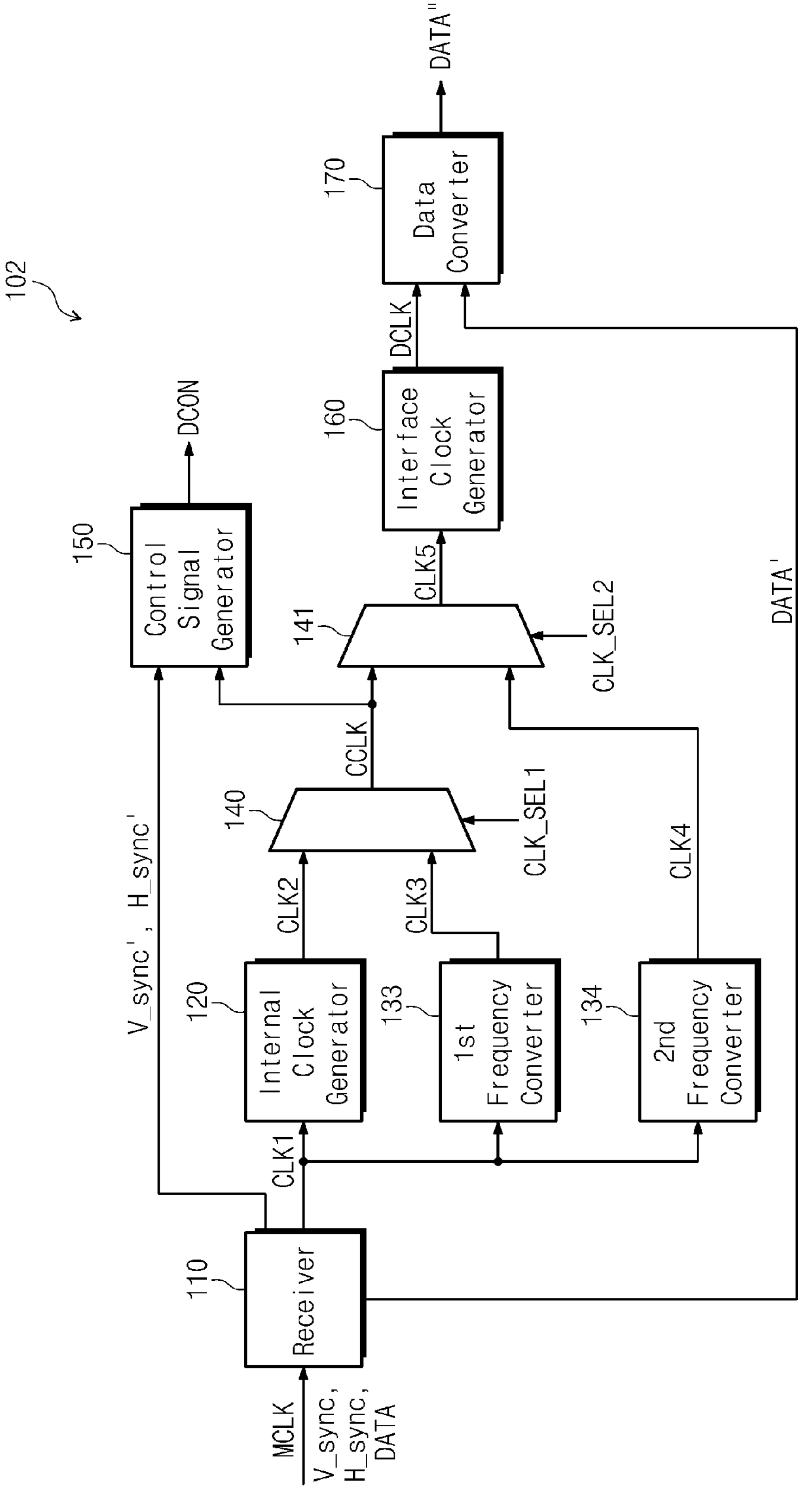
FIG. 7 is a block diagram showing another alternative exemplary embodiment of a timing controller according to the present invention.

FIG. 7 is a block diagram showing another alternative exemplary embodiment of the timing controller 102 according to the present invention.

Referring to FIG. 7, the timing controller 102 includes the receiver 110, the internal clock generator 120, a first frequency converter 133, a second frequency converter 134, the first selector 140, the second selector 141, the control signal generator 150, the interface clock generator 160 and the data converter 170. Since the receiver 110, the internal clock generator 120, the first selector 140, the second selector 141, the control signal generator 150, the interface clock generator 160, and the data converter 170 are substantially the same as those in FIG. 3, the same elements shown in FIG. 7 have been labeled with the same reference characters as used above to describe the exemplary embodiments of the timing controller 101 shown in FIG. 3, and any repetitive detailed description thereof will hereinafter be omitted or simplified.

The internal clock generator 120 multiplies the frequency of the first clock signal CLK1. In one exemplary embodiment, for example, the reference frequency of the first clock signal CLK1 may become doubled, e.g., multiplies the frequency of the first clock signal CLK1 by 2, and the internal clock generator 120 may include a PLL circuit. As described above with reference to FIG. 2, the internal clock generator 120 includes a filter to determine when the second clock signal CLK2, which is output by adjusting the bandwidth of the filter, has a spread spectrum frequency. In an exemplary embodiment, where the bandwidth of the filter is adjusted to a narrow bandwidth, only a specific frequency band in the multiplied frequencies of the first clock signal CLK1 passes through the filter. Accordingly, the second clock signal CLK2 has only the specific frequency band. In an alternative exemplary embodiment, where the bandwidth of the filter is adjusted to a wide bandwidth, only the reference frequency of the second clock signal CLK2 is changed, the second clock signal CLK2 has the period and the fluctuation range substantially the same as the period and the fluctuation range of the first clock signal CLK1.

The first frequency converter 133 converts the first clock signal CLK1 to the third clock signal CLK3 having a second spread spectrum frequency. The third clock signal CLK3 has the first fluctuation range and the first period based on the reference frequency. The reference frequency may be different from that of the first clock signal CLK1. In one exemplary embodiment, for example, the reference frequency of the third clock signal CLK3 may be greater than twice the reference frequency of the first clock signal CLK1. In an exemplary embodiment, the first fluctuation range may be between about ±1% and about ±3% of the reference frequency, and the first reference modulation frequency may be about 150 kHz.

The second frequency converter 134 converts the first clock signal CLK1 to a fourth clock signal CLK4 having a third spread spectrum frequency. The fourth clock signal CLK4 has a second fluctuation range and a second period based on the reference frequency. The reference frequency of the fourth clock signal CLK4 may be different from the reference frequency of the first clock signal CLK1. In one exemplary embodiment, for example, the reference frequency of the fourth clock signal CLK4 may be greater than twice the reference frequency of the first clock signal CLK1.

In an exemplary embodiment, the second spread spectrum frequency may be different from the third spread spectrum frequency. In one exemplary embodiment, for example, the second and third spread spectrum frequency may be in a relationship as shown in the graph of FIG. 6.

As described above, the data signal is converted based on a clock having the third spread spectrum frequency with the fluctuation range less than the fluctuation range of the second spread spectrum frequency and a period greater than the period of the second spread spectrum frequency, and the jitter is thereby substantially reduced. Accordingly, signal distortion caused by the jitter is substantially reduced, such that transmission quality is substantially improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A timing controller comprising:

a receiver which receives an image signal and a main clock signal having a first spread spectrum frequency from an external system, converts the main clock signal to a converted main clock signal and the image signal to a first converted image signal, and outputs the converted main clock signal as a first clock signal having a plurality of frequencies;

an internal clock generator which multiplies the frequencies of the first clock signal and generates a second clock signal having a frequency band within the multiplied frequencies of the first clock signal by filtering the multiplied frequencies of the first clock signal;

a first frequency converter which converts the second clock signal to a third clock signal having the reference frequency of the second clock signal and a second spread spectrum frequency;

a first selector which selects one of the second clock signal and the third clock signal in response to a first selection signal and outputs the selected one of the second clock signal and the third clock signal as a control clock signal; and a control signal generator which receives the control clock signal from the first selector to generate a control signal synchronized with the control clock signal.

2. The timing controller of claim 1, further comprising:

an interface clock generator which converts the control clock signal based on an interface with the external system to output a data clock signal; and a data converter which receives the data clock signal from the interface clock generator, converts the first converted image signal from the receiver to a second converted image signal based on the interface with the external system in synchronization with the data clock signal, and outputs the second converted image signal.

3. The timing controller of claim 1, further comprising:

a second frequency converter which converts the second clock signal to a fourth clock signal having a third spread spectrum frequency different from the second spread spectrum frequency to output the fourth clock signal; and a second selector which selects one of the fourth clock signal and the control clock signal in response to a second selection signal and outputs the selected one of the fourth clock signal and the control clock signal as a fifth clock signal.

4. The timing controller of claim 3, further comprising:

an interface clock generator which converts the fifth clock signal based on an interface with the external system to output a data clock signal; and a data converter which receives the data clock signal from the interface clock generator, converts the first converted image signal received from the receiver to a second converted image signal based on the interface with the external system in synchronization with the data clock signal, and outputs the second converted image signal.

5. The timing controller of claim 3, wherein the second spread spectrum frequency fluctuates at a first period within a first range based on the reference frequency, the third spread spectrum frequency fluctuates at a second period within a second range based on the reference frequency, and the first range is less than the second range.

6. The timing controller of claim 5, wherein the second period is greater than the first period.

7. A display apparatus comprising:

a data driver which generates a data voltage;

a gate driver which generates a gate signal; and a timing controller which supplies a control signal and a clock signal, wherein at least one of the control signal and the clock signal are used to generate the gate signal and the data voltage, wherein the timing controller comprises:

a receiver which receives an image signal and a main clock signal having a first spread spectrum frequency from an external system, converts the main clock signal to a converted main clock signal and the image signal to a converted image signal, and outputs the converted main clock signal as a first clock signal having a plurality of frequencies;

an internal clock generator which multiplies the frequencies of the first clock signal and generates a second clock signal having a frequency band within the multiplied frequencies of the first clock signal;

a first frequency converter which converts the second clock signal to a third clock signal having a second spread spectrum frequency;

a first selector which selects one of the second clock signal and the third clock signal in response to a first selection signal and outputs the selected one of the second clock signal and the third clock signal as a control clock signal;

a control signal generator which receives the control clock signal from the first selector and generates a control signal synchronized with the control clock signal;

an interface clock generator which converts the control clock signal based on an interface with the data driver and outputs a data clock signal; and a data converter which receives the data clock signal from the interface clock generator and outputs image data information in synchronization with the data clock signal.

8. The display apparatus of claim 7, further comprising:

a second frequency converter which converts the second clock signal to a fourth clock signal having a third spread spectrum frequency different from the second spread spectrum frequency and outputs the fourth clock signal; and a second selector which selects one of the fourth clock signal and the control clock signal in response to a second selection signal and outputs the selected one of the fourth clock signal and the control clock signal as a fifth clock signal.

9. The display apparatus of claim 8, wherein the second spread spectrum frequency fluctuates at a first period within a first range based on a reference frequency, the third spread spectrum frequency fluctuates at a second period within a second range based on the reference frequency, and the first range is less than the second range.

10. A method of driving a timing controller, the method comprising:

converting a voltage level of an external clock signal having a first spread spectrum frequency to a first clock signal having a plurality of frequencies;

converting an external image signal to a first converted image signal;

multiplying frequencies of the first clock signal, generating a second clock signal having a frequency band within the multiplied frequencies of the first clock signal by filtering the multiplied frequencies of the first clock signal;

wherein the frequency band includes a reference frequency;

converting the second clock signal to generate a third clock signal having the reference frequency of the second clock signal and a second spread spectrum frequency;

selecting one of the second clock signal and the third clock signal in response to a first selection signal and outputting the selected one of the second clock signal and the third clock signal as a control clock signal; and generating a control signal synchronized with the control clock signal.

11. The method of claim 10, further comprising:

converting the control clock signal based on an interface with an external system and outputting a data clock signal; and converting an image signal based on the data clock signal.

12. The method of claim 10, further comprising:

converting the second clock signal to a fourth clock signal having a third spread spectrum frequency different from the second spread spectrum frequency and outputting the fourth clock signal; and selecting one of the fourth clock signal and the control clock signal in response to a second selection signal.

13. The method of claim 12, wherein the second spread spectrum frequency fluctuates at a first period within a first range based on a reference frequency, the third spread spectrum frequency fluctuates at a second period within a second range based on the reference frequency, and the first range is less than the second range.

* * * * *